United States Patent
Peddamgari et al.

(10) Patent No.: US 12,530,512 B2
(45) Date of Patent: Jan. 20, 2026

(54) CIRCUIT SIMULATION BASED ON AN RTL COMPONENT IN COMBINATION WITH BEHAVIORAL COMPONENTS

(71) Applicant: Xilinx, Inc., San Jose, CA (US)

(72) Inventors: Nageshwar Reddy Peddamgari, Ramachandrapuram (IN); Sourabh Anand, Kondapur (IN); Vasudha Annam, Kompally (IN); Chandra Sekhar Mulpuri, Hyderabad (IN)

(73) Assignee: XILINX, INC., San Jose, CA (US)

( * ) Notice: Subject to any disclaimer, the term of this patent is extended or adjusted under 35 U.S.C. 154(b) by 772 days.

(21) Appl. No.: 17/746,512

(22) Filed: May 17, 2022

(65) Prior Publication Data

US 2023/0376662 A1 Nov. 23, 2023

(51) Int. Cl.
*G06F 30/3308* (2020.01)
*G06F 30/331* (2020.01)
*G06F 117/08* (2020.01)

(52) U.S. Cl.
CPC ........ *G06F 30/3308* (2020.01); *G06F 30/331* (2020.01); *G06F 2117/08* (2020.01)

(58) Field of Classification Search
CPC .............. G06F 30/3308; G06F 30/331; G06F 2117/08; G06F 30/33
See application file for complete search history.

(56) References Cited

U.S. PATENT DOCUMENTS

| | | | |
|---|---|---|---|
| 10,762,265 B1 * | 9/2020 | Fang | G06F 9/547 |
| 11,513,818 B1 * | 11/2022 | Chen | G06F 9/44521 |
| 2005/0010880 A1 * | 1/2005 | Schubert | G01R 31/31705 |
| | | | 716/106 |
| 2011/0307233 A1 * | 12/2011 | Tseng | G06F 30/347 |
| | | | 703/21 |
| 2014/0269690 A1 * | 9/2014 | Tu | H04L 45/54 |
| | | | 370/389 |
| 2015/0090342 A1 * | 4/2015 | Cartwright | G05B 13/04 |
| | | | 137/2 |

OTHER PUBLICATIONS

Gupta et al., "Shadow Simulation: A new verification methodology for Configurable Logic", XLNX All Programable, 2016 DVCON Design and Verification Conference and Exhibition, Europe, copyright Accellera Systems Initiative.

* cited by examiner

*Primary Examiner* — Rehana Perveen
*Assistant Examiner* — John P Hocker
(74) *Attorney, Agent, or Firm* — Patterson + Sheridan, LLP

(57) ABSTRACT

Methods and systems for simulating RTL models in combination with behavioral models involve generating an overall simulation model from a circuit design by a simulation tool of an EDA system. The overall simulation model includes respective behavioral simulation models of components of the circuit design. A register transfer level (RTL) simulation model of a particular component of the components of the circuit design is generated by an extractor tool of the EDA system. The respective behavioral simulation model of the particular component in the overall simulation model is replaced with the RTL simulation model, and a simulation that executes the overall simulation model and the RTL simulation model in place of the behavioral simulation model of the particular component is performed.

16 Claims, 4 Drawing Sheets

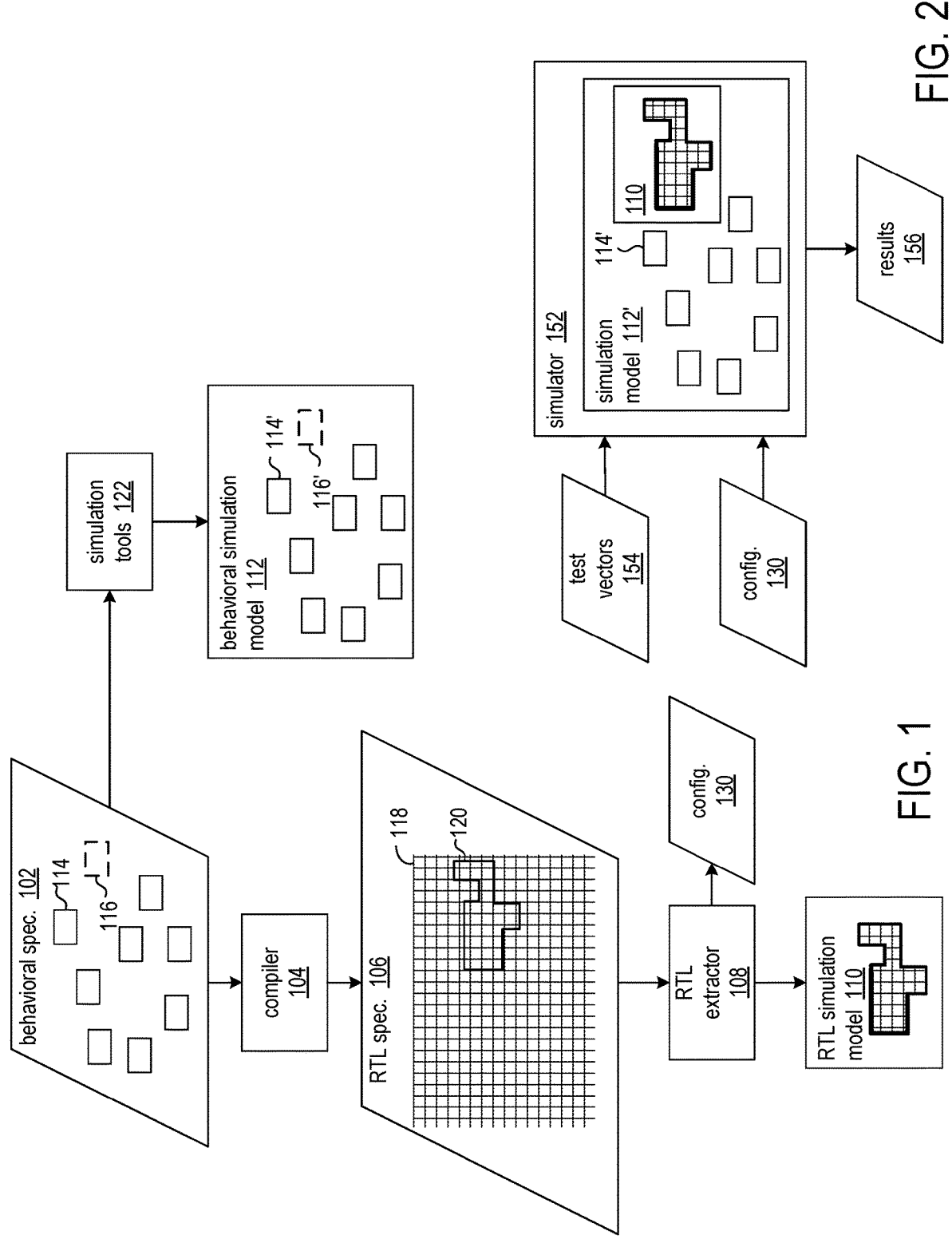

CIRCUIT SIMULATION BASED ON AN RTL COMPONENT IN COMBINATION WITH BEHAVIORAL COMPONENTS

TECHNICAL FIELD

The disclosure generally relates to simulation of circuits.

BACKGROUND

A complex electronic system can have components implemented as a combination of software executing on a processor subsystem, circuits configured in programmable logic, and/or application specific integrated circuits (ASICs). Debugging complex electronic systems can be a complex endeavor, requiring expertise from many designers and a long period of time. System designers understand the functions of the components of the system but often do not understand the programmable logic and ASIC components well enough to expedite debugging. Hardware designers may understand the programmable logic and ASIC components well enough for debugging but not understand the system-level interactions between the components. Even when a particular component is suspected to be the source of a problem and a hardware designer is available to debug the component, debugging a large design based on the full RTL implementation is extremely cumbersome, resource intensive, and often requires specialists to establish the environment to enable debugging.

Once a debugging environment is established, a lack of correlation between nets in the system-level design and the connectivity in the full RTL implementation makes debugging extremely cumbersome and time-consuming. Though efforts have been made to employ supplemental RTL debug logic, the debug logic may change the observability and implementation of nets in the design and obstruct the debugging process.

SUMMARY

A disclosed method includes generating an overall simulation model from a circuit design by a simulation tool of an EDA system. The overall simulation model includes respective behavioral simulation models of components of the circuit design. The method includes generating a register transfer level (RTL) simulation model of a particular component of the components of the circuit design by an extractor tool of the EDA system, and replacing the respective behavioral simulation model of the particular component in the overall simulation model with the RTL simulation model. The method includes performing a simulation that executes the overall simulation model and the RTL simulation model in place of the behavioral simulation model of the particular component.

A disclosed system includes one or more computer processors configured to execute program code and a memory arrangement coupled to the one or more computer processors. The memory arrangement is configured with instructions that when executed by the one or more computer processors cause the one or more computer processors to perform operations including generating an overall simulation model from a circuit design by a simulation tool of an EDA system. The overall simulation model includes respective behavioral simulation models of components of the circuit design. The operations includes generating a register transfer level (RTL) simulation model of a particular component of the components of the circuit design by an extractor tool of the EDA system, and replacing the respective behavioral simulation model of the particular component in the overall simulation model with the RTL simulation model. The operations include performing a simulation that executes the overall simulation model and the RTL simulation model in place of the behavioral simulation model of the particular component.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 1 shows a dataflow diagram exemplifying the extraction of a portion of the register transfer level (RTL) specification of a circuit design for use in simulating a circuit specified by a behavioral specification of the circuit design;

FIG. 2 shows a simulation system that simulates circuit functionality using behavioral-level simulation models of some components of the behavioral specification and using an RTL-level simulation model(s) of another component(s);

DETAILED DESCRIPTION

Figure 3:
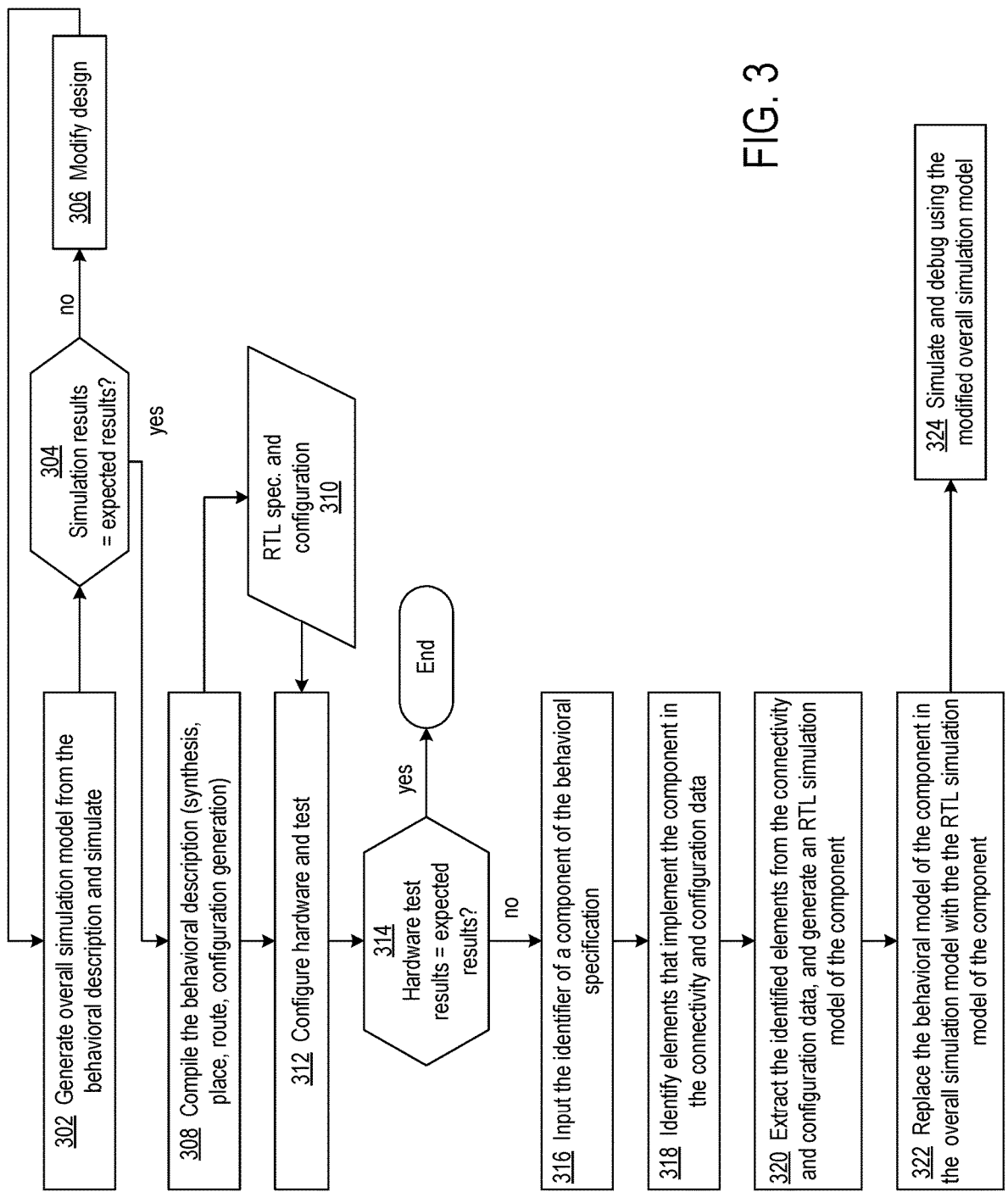
FIG. 3 shows a flowchart of an exemplary process of simulating circuit functionality using behavioral-level simulation models of some components of the behavioral specification and using an RTL-level simulation model(s) of another component(s)

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

System-level design often relies on reuse of previously created designs that have been provided either from within an enterprise or from a commercial provider. Libraries of pre-developed blocks of logic have been developed that can be selected and included in a circuit design. Such library modules include, for example, adders, multipliers, filters, and other arithmetic and digital signal processing (DSP) functions from which system designs can be readily constructed. The library modules may also include memories and storage elements. The engineering community sometimes refers to these previously created designs as "design modules," "cores," "IP cores" (short for intellectual property cores), "logic cores," or "components," and such terms may be used interchangeably herein. The use of pre-developed components permits faster design cycles by eliminating the redesign of circuits. Thus, using components from a library may reduce design costs.

According to the disclosed approaches, when a problem is discovered in the operation or testing of a complex electronic system, a component of the system-level specification can be selected, and the hardware configuration and connectivity information that implements that component can be identified to generate an RTL-level simulation model of that component.

The behavioral-level simulation model of the component is replaced by the RTL-level simulation model of the component in an overall simulation model of the system. In running an overall simulation of the system, the RTL-level simulation model of the component is executed in combination with behavioral-level simulation models of other components of the system. This approach significantly reduces the computational and memory resources required for simulation using the full RTL specification and reduces the need for specialists to configure a simulation environment for RTL-level simulation using the full RTL specification.

FIG. 1 shows a dataflow diagram exemplifying the extraction of a portion of the register transfer level (RTL) specification of a circuit design for use in simulating a circuit specified by a behavioral specification of the circuit design. The behavioral specification 102 can be in a language such as System C, Verilog, VHDL, etc., or a combination thereof. The components in the behavioral specification are shown as blocks, such as blocks 114 and 116.

An electronic design automation (EDA) system can include simulation tools 122 that can generate an overall behavioral simulation model 112 from the behavioral specification. Depending on the system design, the overall simulation model can be a combination of simulation models for System Verilog, SystemC and processor emulation. The overall simulation model 112 includes individual behavioral-level simulation models for the components of the behavioral specification 102. For example, block 114' represents the behavioral simulation model for component 114, and block 116' represents the behavioral simulation model for component 116.

Once a design team decides that the behavioral simulation is satisfactory (simulation output/results=expected output/results), the behavioral specification can be compiled into implementation data for configuring a programmable IC and/or fabricating an IC die. The EDA system can include a compiler 104 that generates an RTL specification 106 by synthesizing, mapping, placing, and routing the behavioral specification. The RTL specification can specify connectivity between hardware elements and is shown as a grid 118 to exemplify a layout of circuit resources involved in an implementation of the circuit design. For example, the circuit resources can be programmable logic, routing, and hardwired resources of a field programmable gate array, or circuit elements according to a layout of on an application specific integrated circuit (ASIC).

Based on the RTL specification, implementation data can be generated and a complete system can be configured or made. In the course of testing or operating the system, an error may be discovered that was not observable during behavioral simulation. As an example, the design team may identify one or more components, such as component 116, of the behavioral specification 102 as a possible source of the error and meriting RTL-level debugging.

The identifier of component 116 can be input to the RTL extractor 108, which can be a design tool within the EDA system. The RTL extractor extracts the portion 120 of the RTL specification 106 that implements the component and creates an RTL simulation model 110. The RTL extractor identifies elements in the RTL specification 106 that implement the component 116 and connectivity between the elements based on names of the signals input to and output from the component. The polygon represents the portion 120 of the RTL specification of the circuit resources involved in the implementation of component 116 of the behavioral specification 102. The RTL extractor generates an RTL simulation model 110 based on identified elements and connectivity. The RTL simulation model 110 can be specified in Verilog, System Verilog, or VHDL code, for example. A wrapper interface of the RTL simulation model has names that match the names of the input/output ports of the component 116. Though only one component is identified in the example for extraction and RTL-level simulation, multiple components can be selected for RTL-level simulation while performing behavior-level simulation of the other components. The RTL extractor also saves implementation data 130 (e.g., a portion of a configuration bitstream) of the extracted RTL simulation model 110. The implementation data is used during simulation to make the RTL simulation model 110 function similar to the behavioral model 116.

FIG. 2 shows a simulation system that simulates circuit functionality using behavioral-level simulation models of some components of the behavioral specification and using an RTL-level simulation model(s) of another component(s). An example simulation system is the ISim Hardware Description Language (HDL) simulator from Xilinx, Inc.

Continuing with the example of FIG. 1, the simulation model 112' differs from behavioral model 112 in that the RTL simulation model 110 is linked to execute with the behavioral-level simulation models, such as model 114', in place of simulation model 116'. The simulator 152 manages the input of the test vectors 154 to the simulation model 112' and the logging of result data 156. The simulator inputs the implementation/configuration data 130 to make the RTL simulation model 110 function similar to the behavioral model 116. The simulator also supports examination of results for debugging.

FIG. 3 shows a flowchart of an exemplary process of simulating circuit functionality using behavioral-level simulation models of some components of the behavioral specification and using an RTL-level simulation model(s) of another component(s). Blocks 302, 304, and 306 illustrate processing associated with iteratively debugging a circuit design using a behavioral simulation model and modifying the design to correct discovered errors. At block 302, the EDA system generates an overall behavioral simulation model from the design, and the designer initiates a behavioral-level simulation by the EDA system. The ISim HDL simulator is an example of a simulator that can generate the behavioral-level simulation model. In response to the simulation results not being equal to expected results, the designer modifies the design at block 306, and the process returns to block 302.

Once the behavioral-level simulation is satisfactory, at block 308 the EDA system compiles the design into an RTL specification and hardware configuration data 310. The compilation process includes synthesis, placement, routing, and generating implementation data for configuring a programmable IC or fabricating an IC. At block 312, the hardware is configured or made and the hardware is tested. No debugging is needed and the process ends if the hardware test results match the expected results at decision block 314. Otherwise, debugging can commence beginning at block 316.

The design team may determine that one or more components are likely the source of the error based on the hardware test results. At block 316, the identifier(s), which can be the name of suspect module in the design (System C, C++, Verilog, VHDL, etc.), of the design component(s) is input to the RTL extractor tool of the EDA system.

At block 318 the RTL extractor identifies the elements and connectivity in the RTL specification that implement the component. The elements includes, for example, sites of an FPGA and connectivity between the sites. The elements can be identified by matching the names of elements and signals in the design specification to names in the RTL specification.

At block 320, the identified elements are extracted from the RTL specification, and an RTL-level simulation model of the identified component is generated. The RTL-level simulation model, when executed, simulates operation of the circuit elements indicated by the extracted portion of the RTL specification.

According to an exemplary approach, which involves generating an RTL-level simulation model for an FPGA-targeted component, some of RTL specification identified as relevant to the component may be determined to be extraneous. An FPGA has many programmable resources, and the implementation of a circuit design is unlikely to require all the resources, and in some cases the implementation may leave a large number of the resources unused. However, the full RTL specification for an FPGA circuit will include programming for both the used and unused FPGA resources. For example, a circuit design may not require all the configurable logic blocks and routing resources available on the FPGA. The programming of the unused resources ensures that the unused circuit resources do not affect the desired functions of the implemented circuit. Simulation of the full RTL specification involving both used and unused resources requires significant computing and memory resources. In generating the RTL simulation model of the specified component, the RTL extractor removes extraneous RTL code, which results in a simulation model that requires fewer computational and memory resources.

According to the disclosed methods and systems, the RTL extractor generates the RTL simulation model from only the parts of the full RTL specification that are used to implement the identified component. In applying the disclosed methods and systems to a circuit design that is targeted for implementation on an FPGA, the RTL extractor deviates from the RTL specification in generating the RTL simulation model to account for FPGA resources that are shared by the implementation of two components. For example, actions undertaken in compiling the behavioral specification into the RTL specification may result in circuitry of FPGA resources being shared by nets of two separate components. In response to finding that a look-up table (LUT) of the target FPGA is to receive input signals from two separate components and one of those components is the component of interest, the RTL extractor modifies the RTL specification of the component of interest to change the configuration of the LUT to eliminate the influence of the input signals from the component that is not of interest.

In generating the RTL simulation model, the RTL extractor generates RTL code (e.g., Verilog, System Verilog, VHDL, etc.) of only the component of interest along with a wrapper interface. The wrapper interface has names that match the names of the input/output ports of the behavioral component of interest. The RTL code and wrapper enables replacement of the behavioral model of the component of interest with the extracted RTL model in the full behavioral model of the design. The RTL extractor also saves implementation data 130 (e.g., a portion of a configuration bitstream) of the extracted RTL simulation model 110. The implementation data is used during simulation to configure elements of the RTL simulation model 110 and make the RTL simulation model function similar to the behavioral model 116. The implementation data/configuration is forced while simulating the RTL model along with the behavioral simulation at time 0.

At block 322, the designer can modify the overall simulation model by replacing the behavioral-level simulation model of the component with the generated RTL-level simulation model of that component.

The simulator can then run the behavioral simulation model and the RTL simulation model in place of the component of interest at block 324. In running the simulation, elements of the RTL simulation model are configured according to the implementation data. In addition, the RTL component generated by the RTL extractor will compensate for differences in the manner in which timing of the simulated circuit is handled between the behavioral-level simulation and RTL-level simulation. In a behavioral-level simulation the entire behavioral model is ready for functional simulation at time 0. In contrast, in an RTL-level simulation the simulation begins a configuration mode at time 0, and not until some later time after the configuration is complete can the behavioral simulation begin. Thus, in running a simulation using an RTL simulation model in combination with a behavioral model, the simulator waits for configuration of the RTL simulation model (programming LUTs etc.) before commencing simulation of the behavioral model. The simulator also sets a global configuration signal used in controlling configuration of the RTL simulation model to a state that indicates completion of configuration before commencing simulation of the behavioral models.

If based on the simulation results, the designer determines that the identified component is the source of an error, design specification of that component can be modified to correct the error, and the process can be repeated beginning at block 302.

Figure 4:
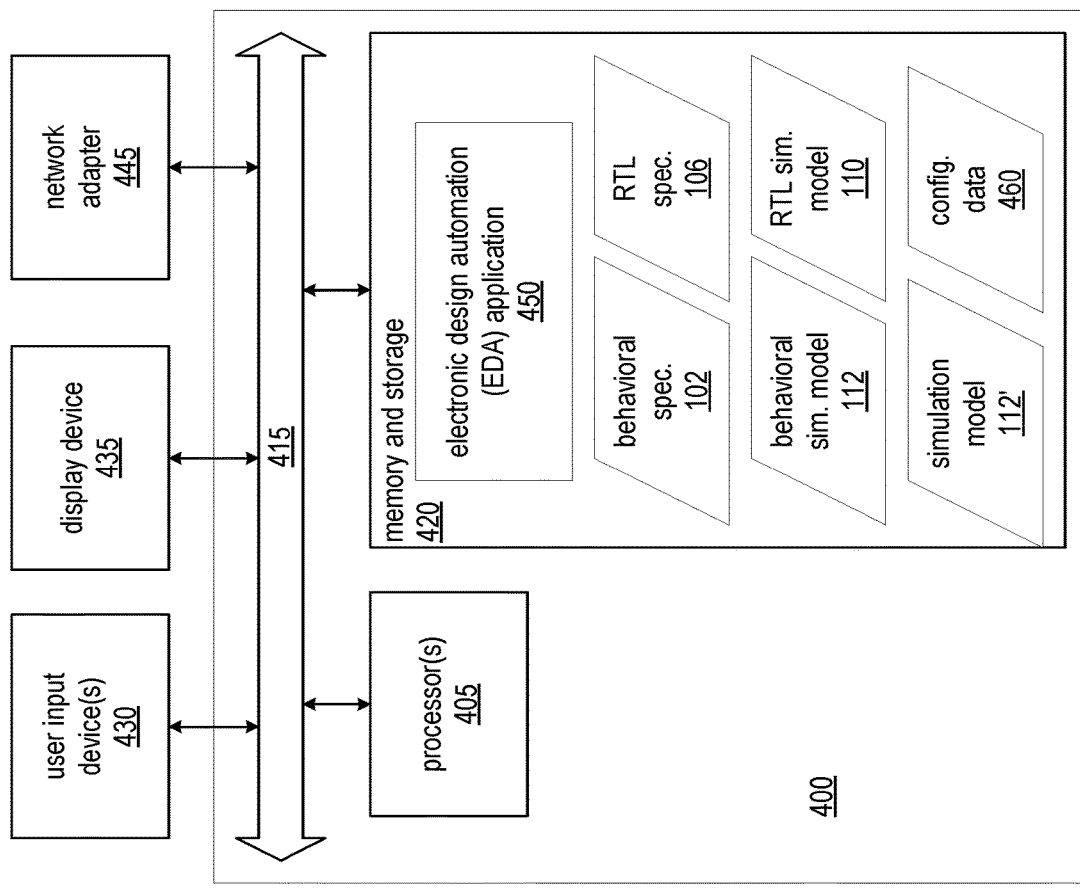
FIG. 4 is a block diagram illustrating an exemplary data processing system.

FIG. 4 is a block diagram illustrating an exemplary data processing system (system) 400. System 400 is an example of an EDA system. As pictured, system 400 includes at least one processor circuit (or "processor") 405, e.g., a central processing unit (CPU) coupled to memory and storage arrangement 420 through a system bus 415 or other suitable circuitry. System 400 stores program code and behavioral specification 102 within memory and storage arrangement 420. Processor 405 executes the program code accessed from the memory and storage arrangement 420 via system bus 415. In one aspect, system 400 is implemented as a computer or other data processing system that is suitable for storing and/or executing program code. It should be appreciated, however, that system 400 can be implemented in the form of any system including a processor and memory that is capable of performing the functions described within this disclosure.

Memory and storage arrangement 420 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 400 may also include one or more cache memories (not shown) that provide temporary storage of at least some program code and data in order to reduce the number of times program code and data must be retrieved from local memory and persistent storage during execution.

Input/output (I/O) devices such as user input device(s) 430 and a display device 435 may be optionally coupled to system 400. The I/O devices may be coupled to system 400 either directly or through intervening I/O controllers. A network adapter 445 also can be coupled to system 400 in order to couple system 400 to other systems, computer systems, remote printers, and/or remote storage devices through intervening private or public networks. Modems, cable modems, Ethernet cards, and wireless transceivers are examples of different types of network adapter 445 that can be used with system 400.

Memory and storage arrangement 420 may store an EDA application 450. EDA application 450, being implemented in the form of executable program code, is executed by processor(s) 405. As such, EDA application 450 is considered part of system 400. System 400, while executing EDA application 450, receives and operates on behavioral specification 102. In one aspect, system 400 performs a design flow, including simulation based on behavioral specification 102, and the processing includes synthesis, mapping, placement, routing, and simulation as described herein. System 400 generates RTL specification 106, RTL simulation model 110, behavioral simulation model 112, and simulation model 112' according to the processes described herein. Once the design is stable, configuration data 460 can be generated for configuring/making an IC.

EDA application 450 and any data items used, generated, and/or operated upon by EDA application 450 are functional data structures that impart functionality when employed as part of system 400 or when such elements, including derivations and/or modifications thereof, are loaded into an IC such as a programmable IC causing implementation and/or configuration of a circuit design within the programmable IC.

Figure 5:
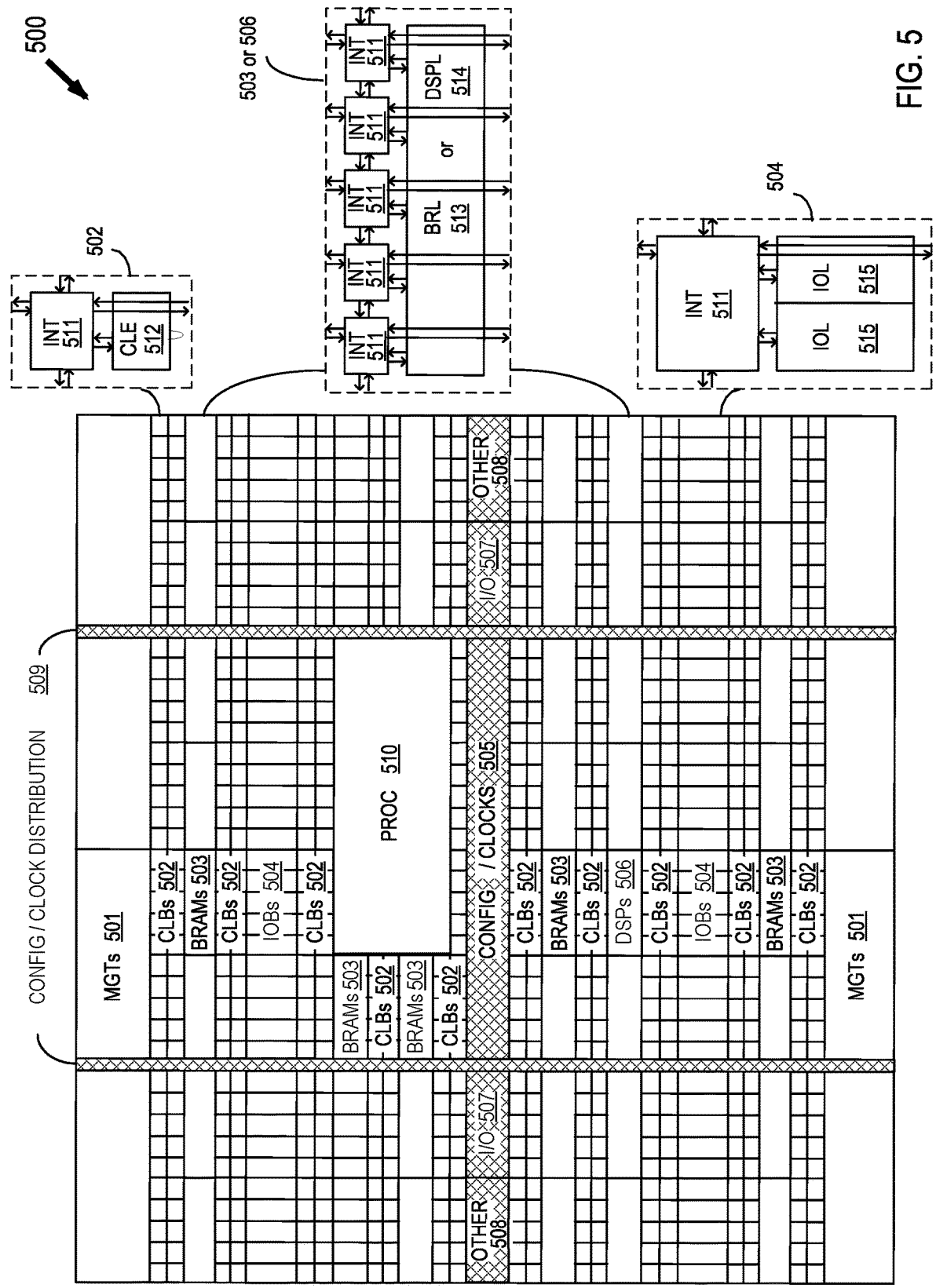
FIG. 5 shows an exemplary programmable integrated circuit.

FIG. 5 shows an exemplary programmable integrated circuit (IC) 500. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 506 can include a DSP logic element (DSPL) 514 in addition to an appropriate number of programmable interconnect elements. An 10B 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

A columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for simulating circuits. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
generating an overall simulation model of a circuit design by an electronic design automation (EDA) system, wherein the overall simulation model comprises behavioral simulation models of components of the circuit design, and wherein the behavioral models comprise high-level design (HDL) code;

compiling the HDL code into a register transfer level (RTL) specification, by a compiler of the EDA system;

simulating operation of the overall simulation model, by a circuit simulator of the EDA system;

identifying a portion of the RTL specification associated with a first component of the circuit design based on the simulating and based on an identifier of the first component, by an RTL extractor tool of the EDA system;

extracting the portion of the RTL specification associated with the first component, by the RTL extractor tool;

generating a RTL simulation model of the first component based on the extracted portion of the RTL specification, by the EDA system;

providing a modified overall simulation model by replacing the behavioral simulation model of the first component in the overall simulation model with the RTL simulation model; and simulating operation of the modified overall simulation model, by the circuit simulator;

wherein the simulating the operation of the modified overall simulation model is faster than simulating operation of the RTL specification.

2. The method of claim 1, wherein:

the generating the RTL simulation model includes generating implementation data from the extracted portion of the RTL code; and the method further comprises configuring elements of the RTL simulation model, prior to the simulating operation of the modified overall simulation model, based on the implementation data.

3. The method of claim 1, wherein the extracting comprises determining names of elements and signals in the RTL specification that match names specified in the first component.

4. The method of claim 1, wherein the generating the RTL simulation model comprises:

identifying a shared element of the extracted portion of the RTL specification that is shared by the first component and a second component of the circuit design; and modifying the extracted portion of the RTL specification to eliminate an influence of the second component on the shared element.

5. The method of claim 4, wherein:

the shared element comprises a look-up table; and the modifying includes modifying the extracted portion of the RTL specification to eliminate an influence of one or more signals provided to the look-up table by the second component.

6. The method of claim 1, wherein:

the generating the RTL simulation model includes:

determining names of input/output ports of the first component; and generating a wrapper interface on the RTL simulation model that has names that match the names of the input/output ports; and the replacing comprises replacing the behavioral simulation model of the first component with the RTL simulation model based on the wrapper interface.

7. The method of claim 1, wherein the generating the RTL simulation model comprises saving implementation data of the RTL simulation model, the method further comprising:

configuring the RTL simulation model based on the implementation data at a beginning of the simulating the operation of the modified overall simulation model; and waiting for completion of the configuring before commencing the simulating the operation of the modified overall simulation model.

8. The method of claim 1, wherein the simulating the operation of the modified overall simulation model comprises setting a global configuration signal used in controlling configuration of the RTL simulation model to a state that indicates completion of configuration before commencing the simulating the operation of the modified overall simulation model.

9. A system comprising: one or more computer processors and memory comprising instructions that cause the one or more processors to generate an overall simulation model of a circuit design, wherein the overall simulation model comprises behavioral simulation models of components of the circuit design, and wherein the behavioral models comprise hardware design level (HDL) code;

compile the HDL code into a register transfer level (RTL) specification;

simulate operation of the overall simulation model;

identify a portion of the RTL specification associated with a first component of the circuit design based on an identifier of the first component;

extract the portion of the RTL specification associated with the first component, by the RTL extractor;

generate a register transfer level (RTL) simulation model of the first component, based on the extracted portion of the RTL specification;

provide a modified overall simulation model by replacing the behavioral simulation model of the first component with the RTL simulation model in the overall simulation model with the RTL simulation model; and simulate operation of the modified overall simulation model;

wherein simulating the operation of the modified overall simulation model is faster than simulating operation of the RTL specification.

10. The system of claim 9, wherein the instructions further cause the one or more processors to:

generate implementation data from the extracted portion of the RTL specification; and configure elements of the RTL simulation model based on the implementation data.

11. The system of claim 9, wherein the instructions further cause the one or more processors to identify the portion of the RTL specification associated with the first component of the circuit design based on names of elements and signals in the RTL specification and names associated with the first component.

12. The system of claim 9, wherein the instructions further cause the one or more processor to:

identify a shared element of the portion of the RTL specification that is shared by the first component and a second component of the circuit design; and modify the extracted portion of the RTL specification to eliminate an influence of the second component on the shared element.

13. The system of claim 12, wherein:

the shared element comprises a look-up table; and the instructions further cause the one or more processors to modify the extracted portion of the RTL specification to eliminate an influence of one or more signals provided to the look-up table by the second component.

14. The system of claim 9, wherein the instructions further cause the one or more processors to:
   determine names of input/output ports of the first component;
   generate a wrapper interface on the RTL simulation model that has names that match the names of the input/output ports; and
   replace the behavioral simulation model of the first component with the RTL simulation model based on the wrapper interface.

15. The system of claim 9, wherein the instructions further cause the one or more processors to:
   save implementation data of the RTL simulation model;
   configure the RTL simulation model based on the implementation data at a beginning of the simulating the operation of the modified overall simulation model; and
   wait for completion of the configuring before commencing the simulating the operation of the modified overall simulation model.

16. The system of claim 9, wherein the instructions further cause the one or more processors to set a global configuration signal used in controlling configuration of the RTL simulation model to a state that indicates completion of configuration before commencing simulation of the behavioral models.

* * * * *